United States Patent
Jung et al.

(10) Patent No.: US 10,252,922 B2
(45) Date of Patent: Apr. 9, 2019

(54) ELECTROLYSIS DEVICE

(71) Applicant: Techwin Co., Ltd., Cheongju, Chungcheongbuk-do (KR)

(72) Inventors: Boong Ik Jung, Chungcheongbuk-do (KR); Jung Sik Kim, Chungcheongbuk-do (KR); Hyun Su Shin, Daejeon (KR); Sun Duk Hwang, Daejeon (KR)

(73) Assignee: Techwin Co., Ltd., Cheongju, Chungcheongbuk-do (KR)

( * ) Notice: Subject to any disclaimer, the term of this patent is extended or adjusted under 35 U.S.C. 154(b) by 195 days.

(21) Appl. No.: 15/360,527

(22) Filed: Nov. 23, 2016

(65) Prior Publication Data

US 2017/0073821 A1    Mar. 16, 2017

Related U.S. Application Data

(63) Continuation of application No. PCT/KR2015/005784, filed on Jun. 9, 2015.

(30) Foreign Application Priority Data

Jun. 25, 2014  (KR) .................. 10-2014-0078193

(51) Int. Cl.
  *C25B 1/26*   (2006.01)
  *C02F 1/461*  (2006.01)
  (Continued)

(52) U.S. Cl.
  CPC .......... *C02F 1/46104* (2013.01); *B01J 19/24* (2013.01); *B01J 19/2475* (2013.01);
  (Continued)

(58) Field of Classification Search
  CPC ....................................................... C02F 1/20
  See application file for complete search history.

(56) References Cited

U.S. PATENT DOCUMENTS

| | | | | |
|---|---|---|---|---|
| 4,171,350 A | * | 10/1979 | Sanders | .............. B01J 19/0006 376/301 |
| 4,374,116 A | * | 2/1983 | Chuang | .................... B01J 8/025 423/580.2 |

(Continued)

FOREIGN PATENT DOCUMENTS

| | | | | |
|---|---|---|---|---|
| DE | 3735758 A1 | * | 5/1989 | ............... C02F 1/20 |
| JP | 55-092121 A | * | 7/1980 | ............. B01J 20/16 |

(Continued)

OTHER PUBLICATIONS

Grigoriev et al, Hydrogen safety aspects related to high-pressure polymer electrolyte membrane water electrolysis, International Journal of Hydrogen Energy, vol. 34, No. 14, Jul. 2009, pp. 5986-5991 (Year: 2009).*

(Continued)

*Primary Examiner* — Harry D Wilkins, III
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed is an electrolysis device including: an electrolyzing tank generating electrolyzed water and hydrogen gas as by-product gas by electrolyzing raw water supplied from a raw water supply unit; and a catalyst reaction tank having therein a hydrophobic catalyst, and receiving the hydrogen gas generated from the electrolyzing tank, and removing the hydrogen gas by a catalyst reaction.

14 Claims, 6 Drawing Sheets

(51) Int. Cl.
*C02F 1/467* (2006.01)
*C25B 15/00* (2006.01)
*C25B 1/04* (2006.01)
*B01J 19/24* (2006.01)
*C25B 15/08* (2006.01)

(52) U.S. Cl.
CPC .............. *C02F 1/4674* (2013.01); *C25B 1/04* (2013.01); *C25B 1/26* (2013.01); *C25B 15/00* (2013.01); *C25B 15/08* (2013.01); *B01J 2219/24* (2013.01); *Y02E 60/366* (2013.01)

(56) References Cited

U.S. PATENT DOCUMENTS

| | | | | |
|---|---|---|---|---|
| 4,528,078 A | * | 7/1985 | Hirschfeld | B01D 53/326 204/277 |
| 5,093,535 A | * | 3/1992 | Harrison | B01J 8/02 554/141 |
| 5,725,781 A | * | 3/1998 | Bousquet | B01J 21/18 210/757 |
| 6,126,811 A | * | 10/2000 | Barbier | C02F 1/20 204/253\ |
| 2010/0219077 A1 | * | 9/2010 | Sohn | C02F 1/4674 423/580.2 |
| 2012/0024784 A1 | * | 2/2012 | Clark | B01D 19/0031 210/638 |

FOREIGN PATENT DOCUMENTS

| | | | | |
|---|---|---|---|---|
| JP | 61-197404 A | | 9/1986 | |
| JP | 62-083301 A | * | 4/1987 | .............. B01J 23/40 |
| JP | 11-333463 A | | 12/1999 | |
| JP | 11-333463 A | | 12/1999 | |
| KR | 10-2012-0015298 A | | 2/2012 | |
| KR | 10-2013-0074785 A | | 7/2013 | |
| KR | 10-1296213 B1 | | 8/2013 | |
| WO | WO 95/24360 A1 | * | 9/1995 | .............. B01J 21/18 |
| WO | WO 2006048072 A1 | * | 5/2006 | .............. B01J 12/00 |

OTHER PUBLICATIONS

Machine translation of Jung et al (KR 101296213 B1) obtained at http://worldwide.espacenet.com on Jul. 31, 2018 (Year: 2012).*
Kang, Hee-Suk et al., "Synthetic Characteristics of Porous Polymeric Catalyst Support", J. of Korean Ind. & Eng. Chemistry, vol. 7, No. 4 (Aug. 1996) pp. 715-725.
Ship Science and Technology, vol. 31(5), 129-132 (May 2009).

* cited by examiner

ELECTROLYSIS DEVICE

CROSS-REFERENCE TO RELATED APPLICATIONS

This is a continuation application of International Application No. PCT/KR2015/005784 filed on Jun. 9, 2015, which claims priority to Korean Application No. 10-2014-0078193 filed on Jun. 25, 2014. The applications are incorporated herein by reference.

TECHNICAL FIELD

The present invention generally relates to an electrolysis device. More particularly, the present invention relates to an electrolysis device capable of removing hydrogen gas produced as a by-product by a cathodic reaction during an electrolysis process.

BACKGROUND ART

In general, an electrolysis process is used for a variety of processes such as production or decomposition or precipitation and coating of a variety of chemical products. Such electrolysis processes accompany a reaction producing hydrogen gas mostly at the cathode in addition to an electrochemical reaction required in the electrolysis process. The hydrogen gas is renewable energy fuel source, and is produced as a by-product during the electrolysis process unless produced for additional purposes. However, such hydrogen gas has a very wide explosive range, thereby always has the inherent risk of explosion.

In order to exclude the risk of hydrogen gas explosion, a method of discharging hydrogen gas ($H_2$) to the atmosphere after dilution with ambient air is mainly used in view of the fact that hydrogen gas is a very light gas. Further, processes that purify and recycle the hydrogen gas by increasing a purity of the hydrogen gas to upper limit of the explosive range and above have been adapted.

As an example of the electrolysis process, an electrolysis device using a technique, which is one of emerging techniques for sterilization and disinfection, of electrolyzing brine or seawater and producing an aqueous solution of sodium hypochlorite so as to be used as a disinfectant solution, has been developed.

In other words, the electrolysis device is a device that electrolyzes brine or seawater and generates sodium hypochlorite (Sodium Hypochlorite; NaOCl). Here, the produced sodium hypochlorite can be used in sterilization of purification plants, sewage treatment plants, and swimming pools, and processing a coolant of a power plant or ballast water of a vessel.

When operating the device generating sodium hypochlorite, the brine or seawater is electrolyzed in an electrolysis module, thereby generating chlorine, hydrogen, and oxygen gases. Here, the chlorine gas is quickly dissolved in water ($H_2O$) or is reacted with hydroxide ions ($OH^-$), and is converted to hypochlorite. After that, the hydrogen and oxygen gases that are not dissolved in water are discharged to the atmosphere through a gas-liquid separator. Here, the hydrogen gas is explosive when concentration thereof is equal to or greater than 4%. Thus, the hydrogen is discharged by using an air blower capable of forcibly supplying air, or the hydrogen is discharged after separation by the gas-liquid separator such as a cyclone separator, and dilution to concentration of less than 4%.

As such, the device generating sodium hypochlorite always possess the inherent risk due to hydrogen gas generation. Thus, it requires that the hydrogen gas be removed so as to prevent the underlying risk, thereby reducing the inherent risk due to hydrogen gas generation.

SUMMARY

Accordingly, the present invention has been made keeping in mind the above problems occurring in the related art, and the present invention is intended to propose an electrolysis device capable of removing hydrogen gas produced during electrolysis by a catalyst reaction.

In order to achieve the above object, according to an aspect of the present invention, there is provided an electrolysis device including: an electrolyzing tank generating electrolyzed water, and hydrogen gas as by-product gas by electrolyzing raw water supplied from a raw water supply unit; and a catalyst reaction tank having therein a hydrophobic catalyst, and receiving the hydrogen gas generated from the electrolyzing tank, and removing the hydrogen gas by a catalyst reaction.

Here, the catalyst reaction tank may include: a body; and a hydrophobic catalyst provided inside the body, and generating water by the catalyst reaction with the hydrogen gas, in which the body may be provided with: a gas-liquid mixture inlet through which a gas-liquid mixture of the electrolyzed water and the hydrogen gas as the by-product gas that are generated by electrolysis is introduced into the body; an electrolyzed water outlet through which the electrolyzed water is discharged from the body; an ambient air inlet through which ambient air including oxygen or air is introduced into the body; and a gas outlet through which remaining gas that remains in the body after the catalyst reaction is discharged from the body.

Further, the gas-liquid mixture inlet and the electrolyzed water outlet may be installed on the body at opposite sides of the hydrophobic catalyst, and the ambient air inlet and the gas outlet may be installed on the body at opposite sides of the hydrophobic catalyst.

Further, the catalyst reaction tank may include: a body; and a hydrophobic catalyst provided inside the body, and generating water by the catalyst reaction with the hydrogen gas, in which the body may be provided with: a by-product gas inlet through which the by-product gas is introduced into the body; a processed gas outlet through which processed gas that remains in the body after removing the hydrogen gas from the by-product gas by the catalyst reaction is discharged from the body; an ambient air inlet through which ambient air including oxygen or air is introduced into the body, a coolant inlet through which a coolant is introduced into the body so as to control heat generated during the catalyst reaction; and a coolant outlet through which the coolant after being used is discharged from the body.

Further, the by-product gas inlet and the processed gas outlet may be installed on the body at opposite sides of the hydrophobic catalyst, the ambient air inlet may be installed on the body at the same side as the by-product gas inlet, the coolant inlet and the coolant outlet may be installed on the body at opposite sides of the hydrophobic catalyst, and the coolant inlet may be installed on the body at a position capable of spraying the coolant from a side of the processed gas outlet towards the hydrophobic catalyst.

Further, the ambient air inlet may be installed on a line of the by-product gas inlet to introduce the ambient air into the catalyst reaction tank.

Further, the catalyst reaction tank may include: a body; a hydrophobic dividing plate dividing an inside of the body into a catalyst receiving part provided at a first side, and an electrolyte receiving part provided at a second side; and the hydrophobic catalyst received in the catalyst receiving part, and generating water by the catalyst reaction with the hydrogen gas.

Further, the electrolyte receiving part of the body may be provided at a first side thereof with an electrolyte inlet through which an electrolyte containing by-product hydrogen gas is introduced, and at a second side thereof with an electrolyte outlet discharging an electrolyte from which the by-product hydrogen gas is removed, and the catalyst receiving part of the body may be provided at a first side thereof with an ambient air inlet through which ambient air including oxygen or air is introduced, and at a second side thereof with a gas outlet through which remaining gas that remains in the body after the catalyst reaction is discharged.

Further, the electrolyte may be a gas-liquid mixture consisting of the electrolyzed water and the byproduct-gas that are generated by electrolysis or may be the by-product gas that remains in the body after separation of the electrolyzed water from the electrolyte.

Further, a coolant inlet may be further provided on the body so as to supply a coolant via the ambient air inlet through which the ambient air is supplied to the catalyst receiving part of the body.

Further, the electrolyzed water generated by electrolysis or the raw water introduced into the electrolyzing tank may used as the coolant.

Further, the hydrophobic catalyst may be provided as a catalyst that oxidizes hydrogen gas and is supported on a porous hydrophobic support, and the hydrophobic support may consist of a porous hydrophobic polymer material, or an inorganic or metal material of which a surface is hydrophobically treated.

Further, the catalyst may be composed of one or more elements selected from the group consisting of platinum group metal elements (Pt, Pd, Ru, Ir, Rh, etc.) or transition metal elements (Ni, Cu, Fe, etc.).

Further, the hydrophobic support may be composed of one or more porous hydrophobic polymer materials selected from the group consisting of PTFE, PVDF, PP, and SDBC.

Further, the hydrophobic support may be formed into one shape selected from the group consisting of bead, honeycomb, sheet, mesh, tube, and hollow-fiber shapes.

Further, the hydrophobic catalyst may be supported on one or opposite surfaces of the hydrophobic dividing plate, and is integrally formed into a porous plate membrane structure or a tubular or hollow-fiber membrane structure.

Further, the hydrophobic dividing plate may be formed into a tubular shape, and the hydrophobic catalyst may be formed into a tubular shape and at least one tubular-shaped catalyst may be installed inside the hydrophobic dividing plate, such that the hydrophobic catalyst and the hydrophobic dividing plate may be formed into a tubular or hollow-fiber membrane structure.

According to the present invention having the above-described characteristics, the electrolysis device can remove by-product hydrogen gas produced during the electrolysis process by the catalyst reaction without provision of an additional process or line for discharging hydrogen gas. Therefore, the electrolysis device can achieve securing safety with respect to a hydrogen gas explosion, and a reduction in installation time and space, and costs of components for discharge and separation of hydrogen gas, and ensuring convenience of maintenance and operational safety.

DETAILED DESCRIPTION

Hereinafter, an electrolysis device according to an embodiment of the present invention will be described in detail with reference to accompanying drawings.

Figure 1:
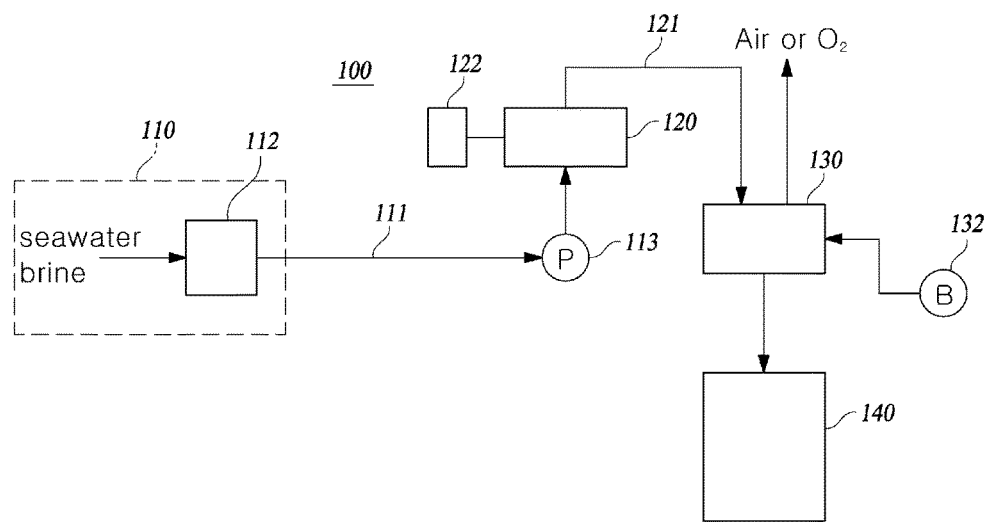
FIG. 1 is a schematic view illustrating an electrolysis device according to an embodiment of the present invention.
Figure 2:
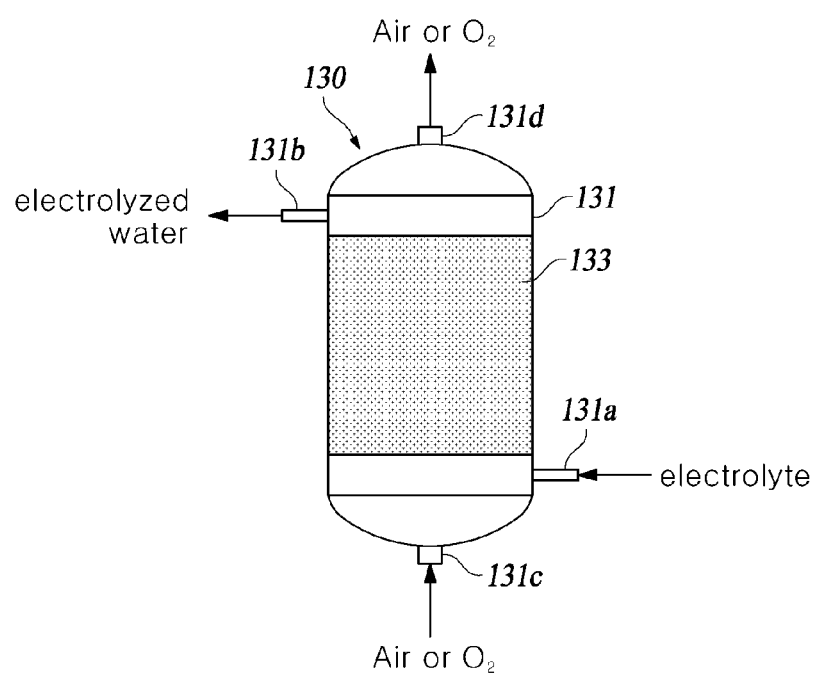
FIG. 2 is a view illustrating a catalyst reaction tank shown in FIG. 1.

With reference to FIGS. 1 to 2, the electrolysis device 100 according to the embodiment of the present invention is provided with an electrolyzing tank 120 electrolyzing raw water supplied from a raw water supply unit 110, and a catalyst reaction tank 130 receiving a gas-liquid mixture of electrolyzed water and hydrogen gas produced as by-product gas, the gas liquid mixture generated from the electrolyzing tank 120, and removing the hydrogen gas by a catalyst reaction and discharging only the electrolyzed water.

In the mean time, brine or seawater will be exemplified as the raw water, and an electrolysis device that generates hypochlorite employed as disinfectant by electrolyzing the brine or seawater will be exemplified in the present invention. However, the present invention can be adapted for use in various fields without being limited thereto.

The raw water supply unit 110 is provided for supplying the raw water to the electrolyzing tank 120, and is provided with a raw water supply pump 113 installed on a raw water supply line 111, and a preprocessing filter 112 installed on the raw water supply line 111. Here, the raw water may be supplied by directly pumping seawater, or from a brine tank (not shown). Further, the reprocessing filter 112 plays a role of filtering impurities contained in the raw water.

The electrolyzing tank 120 is provided with a cathode and an anode therein so as to electrolyze the raw water, namely brine or seawater, introduced into the electrolyzing tank 120 by being supplied electric power from a rectifier 122. In other words, the electrolyzing tank 120 generates an aqueous solution of sodium hypochlorite by electrolyzing the introduced brine or seawater by a known electrolysis method, and generates hydrogen gas produced as by-product gas during electrolysis together with the aqueous solution of sodium hypochlorite. As such, a gas-liquid mixture of the hydrogen gas and the electrolyzed water is supplied to the catalyst reaction tank 130 via an electrolyzed water discharge line 121.

The catalyst reaction tank 130 is supplied with the gas-liquid mixture from the electrolyzing tank 120, and then removes the hydrogen gas by the catalyst reaction and discharges only the desired electrolyzed water (aqueous solution of sodium hypochlorite). Specifically, as shown in FIG. 2, the catalyst reaction tank 130 is provided with a body 131, and a hydrophobic catalyst 133 installed inside the body 131. Here, the body 131 is provided with, a gas-liquid mixture inlet 131a through which a gas-liquid mixture of the electrolyzed water and the hydrogen gas as the by-product gas that are generated by electrolysis is introduced into the body 131, an electrolyzed water outlet 131b through which the electrolyzed water is discharged from the body 131, an ambient air inlet 131c through which ambient air is introduced into the body 131, and a gas outlet 131d through which processed gas is discharged from the body 131. The gas-liquid mixture inlet 131a and the electrolyzed water outlet 131b are installed on the body at opposite sides of the hydrophobic catalyst. Here, the electrolyte outlet 131b is connected to a storage tank 140, such that the electrolyzed water that remains after removing the hydrogen gas in the catalyst reaction tank 130 is supplied to the storage tank 140, or the place where it is needed.

The ambient air inlet 131c is installed at a position adjacent to the gas-liquid mixture inlet 131a, and supplies ambient air, namely air or oxygen ($O_2$) to inside the catalyst reaction tank 130. As such, the ambient air supplied through the ambient air inlet 131c enables easier reaction of the catalyst in the catalyst reaction tank 130, and supplies oxygen required for the catalyst reaction. Here, the ambient air inlet 131c may be connected to an ambient air supply means 132, such as an air blower, a compressor, an oxygen generator, etc., for ambient air supply. Further, the gas outlet 131d is installed on the body 131 at the same side as the electrolyzed water outlet 131b, and discharges oxygen or air that remains after the catalyst reaction to the outside.

Figure 3:
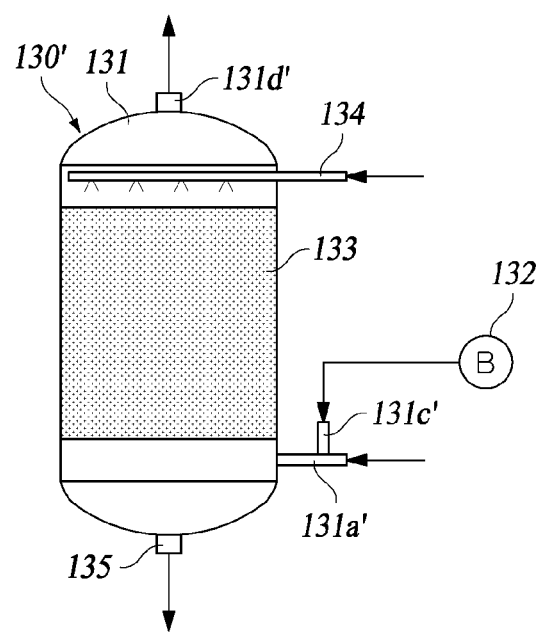
FIG. 3 is a view illustrating a catalyst reaction tank according to another embodiment of the present invention.

Further, a catalyst reaction tank 130' according to another embodiment of the present invention is shown in FIG. 3. In some procedures of the electrolysis process, hydrogen gas provided as by-product gas may be configured to be supplied to the catalyst reaction tank 130' after separation from electrolyzed water. As shown in FIG. 3, a configuration, in which the catalyst reaction tank 130' is provided with a body 131, and a hydrophobic catalyst 133 installed inside the body 131, remains same as FIG. 2.

Further, the catalyst reaction tank 130' is configured to include a by-product gas inlet 131a' at a lower part, such that by-product gas containing hydrogen gas is introduced into the body 131 through the by-product gas inlet 131a', and an ambient air inlet 131c' is installed at a position adjacent to by-product gas inlet 131a'. Here, as shown in FIG. 3, the ambient air inlet 131c' may be installed on a line of the by-product gas inlet 131a' to be connected to each other. However, without being limited to the above configuration, ambient air may be supplied to the body 131 through an additional line. Further, supplied by-product gas and ambient air pass through the hydrophobic catalyst 133 such that hydrogen gas is removed by the catalyst reaction. Then, processed by-product gas is discharged to the outside through a processed gas outlet 131d'. Here, in order to reduce heat generated during the catalyst reaction, the body 131 is configured to include a coolant inlet 134 capable of spraying a coolant and a coolant outlet 135 at upper and lower parts of the hydrophobic catalyst 133 respectively.

The hydrophobic catalyst 133 is contained in the body 131, and preferably it may be configured as a catalyst that oxidizes hydrogen gas and is supported on a porous hydrophobic support. Here, the porous hydrophobic support may consist of a porous hydrophobic polymer material, or an inorganic or metal material of which a surface is hydrophobically treated. In particular, the porous hydrophobic polymer material may be composed of polytetrafluoroethylene (PTFE), polyvinylidene difluoride (PVDF), polypropylene (PP), styrene divinylbenzene copolymer (SDBC), etc. Further, such porous hydrophobic polymer material (hydrophobic catalyst) may be formed into a variety of shapes such as a bead, a honeycomb, a flat-sheet or hollow-fiber membrane shape, etc.

The catalyst is a catalyst that converts hydrogen and oxygen into water, and the catalyst may be composed of one or more elements selected from platinum group metal elements (Pt, Pd, Ru, Ir, Rh, etc.) or transition metal elements (Ni, Cu, Fe, etc.).

Hereinafter, a process electrolyzing raw water (described as brine or seawater in this embodiment) by using the electrolysis device 100 having the above-mentioned configurations will be described.

First, raw water is supplied from a raw water supply unit 110 to an electrolyzing tank 120 while DC electric power is supplied from a rectifier 122 to an anode and a cathode of an electrode installed in the electrolyzing tank 120, such that electrolysis is performed. During electrolysis, chloride ions ($Cl^-$) are converted to chlorine gas ($Cl_2$) at the anode by electrolysis, and hydroxide ions (OH) and hydrogen gas ($H_2$) are generated at the cathode by electrolysis of water ($H_2O$). The generated chlorine gas and hydroxide ions chemically react with each other, thereby generating electrolyzed water in the form of hypochlorite (OCl). A gas-liquid mixture of the generated electrolyzed water and by-product gas is transferred to a catalyst reaction tank 130.

Next, hydrogen ($H_2$) of the gas-liquid mixture transferred to the catalyst reaction tank 130 reacts with oxygen ($O_2$) to thereby be converted into water ($H_2O$) by the catalyst reaction, such that hydrogen gas is removed in the catalyst reaction tank 130. Here, oxygen required for use in the catalyst reaction of by-product hydrogen gas is generated by a side reaction (water ($H_2O$) produces oxygen ($O_2$) and hydrogen ions ($H^+$) by an anode reaction) of the anode reaction during electrolysis in the electrolyzing tank 120. Such oxygen is generated by the side reaction, so the amount of the oxygen produced at the anode is smaller than the amount of hydrogen gas produced at the cathode. Thus, the amount of the oxygen produced at the anode is insufficient to react with all of the hydrogen gas. Accordingly, in order to replenish the insufficient amount of the oxygen, air or oxygen is supplied from the outside, namely through the ambient air inlet 131c, thereby enabling the hydrogen gas produced as by-product gas to be fully removed.

Further, the principle of operation of the catalyst reaction tank 130' shown in FIG. 3 is as follows. First, by-product hydrogen gas generated by electrolysis is introduced through a by-product gas inlet 131a' provided the body 131 of the catalyst reaction tank 130'. Here, air or oxygen is additionally supplied through the by-product gas inlet 131a', thereby providing an oxygen source supplementally required for use in the catalyst reaction of by-product gas. Then, the byproduct hydrogen gas and ambient air are mixed together and pass through a hydrophobic catalyst 133 installed on the body 131'. Here, hydrogen reacts with oxygen to produce water and heat by the catalyst reaction, thereby removing hydrogen in by-product gas. Then, the processed gas that remains after removing hydrogen from by-product gas is discharged to the outside through a processed gas outlet 131d' positioned at an upper end of the catalyst reaction tank 130'. Here, a coolant is supplied through a coolant inlet 134 positioned at an upper part of the hydrophobic catalyst 133 and is sprayed on a hydrophobic catalyst layer. Thus, the coolant reduces heat generated by the catalyst reaction in the hydrophobic catalyst layer by heat exchange, thereby providing safety with respect to explosion of hydrogen gas. Then, the heat-exchanged coolant is discharged to the outside through a coolant outlet 135 positioned at a lower end of the catalyst reaction tank 130'. Here, electrolyzed water generated by electrolysis or raw water introduced into the electrolyzing tank 120 may be used as the coolant.

In the meantime, in the embodiment of the present invention, a hydrophobic catalyst is employed as a catalyst, thus preventing wetting of the catalyst due to water produced by the catalyst reaction. Further, a liquid is further supplied during the catalyst reaction so as to reduce the heat of reaction by heat exchange, thus excluding the risk of explosion due to the heat of reaction. In other words, a widely used catalyst for a hydrogen reaction in the related art is supported on a hydrophilic carrier, so concentration of hydrogen is high. Thus, the conventional catalyst is problematic in that such a large amount of hydrogen results in increasing the converted amount of water, and the produced water causes wetting of the catalyst, thereby causing rapid degradation in reactivity of the catalyst. Further, the conventional catalyst is further problematic in that the heat of reaction generated during the catalyst reaction causes an increase in the risk of explosion. On the other hand, in the present invention, the hydrophobic catalyst is employed as the catalyst so it is possible to prevent degradation in reactivity of the catalyst by excluding wetting of the catalyst. Further, the liquid, namely electrolyzed water, is supplied during the catalyst reaction so it is possible to reduce the heat of reaction through heat exchange.

Figure 4:
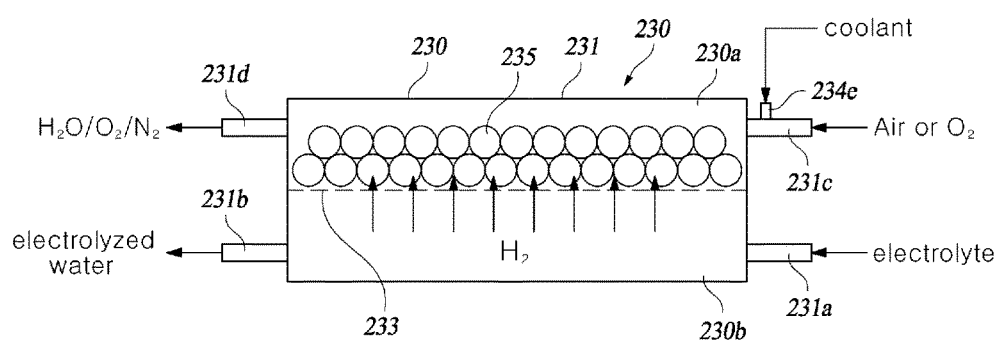
FIG. 4 is a view illustrating a catalyst reaction tank according to a further embodiment of the present invention.

Further, FIG. 4 shows a catalyst reaction tank 230 according to a further embodiment of the present invention. The catalyst reaction tank 230 shown in FIG. 4 is provided with a body 231, a hydrophobic dividing plate 233 dividing an inside of the body 231 into a catalyst receiving part 230a and an electrolyte receiving part 230b, and a hydrophobic catalyst 235 received in the catalyst receiving part 230a.

The catalyst reaction tank 230 is divided into the catalyst receiving part 230a provided at a first side, and the electrolyte receiving part 230b provided at a second side by the hydrophobic dividing plate 233. The hydrophobic catalyst 235 is received in the catalyst receiving part 230a. The electrolyte receiving part 230b of the body 231 is provided at a first side thereof with an electrolyte inlet 231a through which electrolyte containing by-product hydrogen gas is introduced, and at a second side thereof with an electrolyte outlet 231b discharging an electrolyte from which the by-product hydrogen gas is removed.

Further, the catalyst receiving part 230a of the body 231 is provided at a first side thereof with an ambient air inlet 231c and through which ambient air (oxygen or air) is introduced inside the catalyst receiving part 230a. Further, the catalyst receiving part 230a of the body 231 is provided at a second side thereof with a gas outlet 231d and through which remaining gas (oxygen and nitrogen gases) that remains in the catalyst receiving part 230a of the body 231 after the catalyst reaction, and water produced after the catalyst reaction are discharged from the body 231.

Further, by the hydrophobic dividing plate 233, hydrogen gas of the electrolyte introduced into the electrolyte receiving part 230b is transferred to catalyst receiving part 230a provided at the first side of catalyst reaction tank 230, and an electrolyte from which the by-product hydrogen gas is removed is discharged through the electrolyte outlet 231b via the electrolyte receiving part 230b. To this end, the hydrophobic dividing plate 233 is composed of a hydrophobic material having a porous structure capable of passing gaseous hydrogen while it does not pass liquid electrolyzed water.

Here, the electrolyte may be a gas-liquid mixture consisting of electrolyzed water and by-product gas that are generated by electrolysis, or may be one of by-product gas that remains after separation of the electrolyzed water from the electrolyte.

Further, a coolant supplied through a coolant inlet 234e may be supplied together with the ambient air via the ambient air inlet 231c to the catalyst receiving part 230a.

The hydrophobic catalyst 235 has the same configuration and function as the above-described hydrophobic catalyst 233 shown in FIGS. 2 and 3, so detailed description will be omitted below. The hydrophobic catalyst 235 of FIG. 4 is formed into a bead shape as an example. However, the hydrophobic catalyst 235 may be formed into a variety of shapes such as a bead, a honeycomb, a sheet, a mesh, a tube or hollow-fiber shape, etc. Further, the hydrophobic catalyst 235 may be formed into a shape the same as the hydrophobic dividing plate 233 and thereby may have a layer structure.

Figure 5:
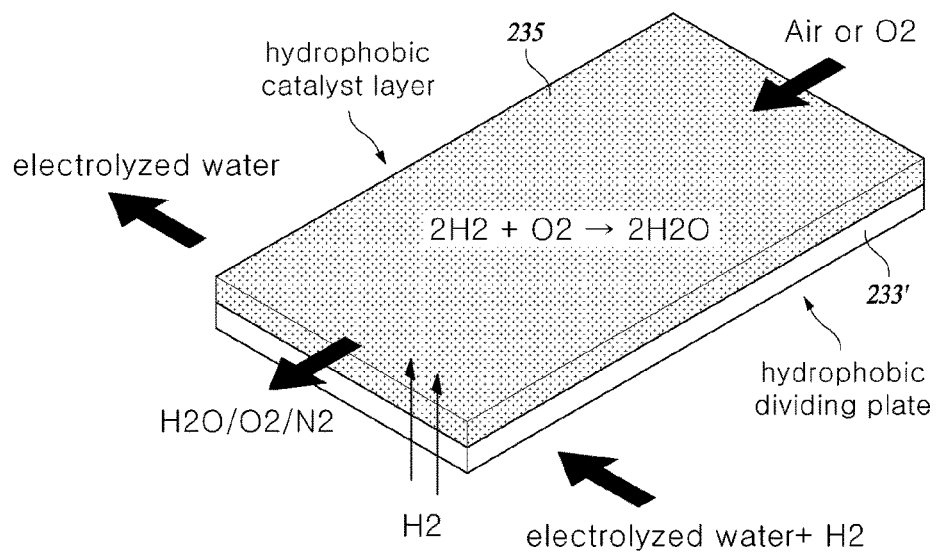
FIG. 5 is a view illustrating an example of a hydrophobic catalyst of FIG. 4.

Further, as shown in FIG. 5, a hydrophobic catalyst 235 may be supported on one or opposite surfaces of the hydrophobic dividing plate 233', so the hydrophobic catalyst 235 may be integrally formed into a porous plate membrane structure, or a tubular or hollow-fiber membrane structure.

Figure 6:
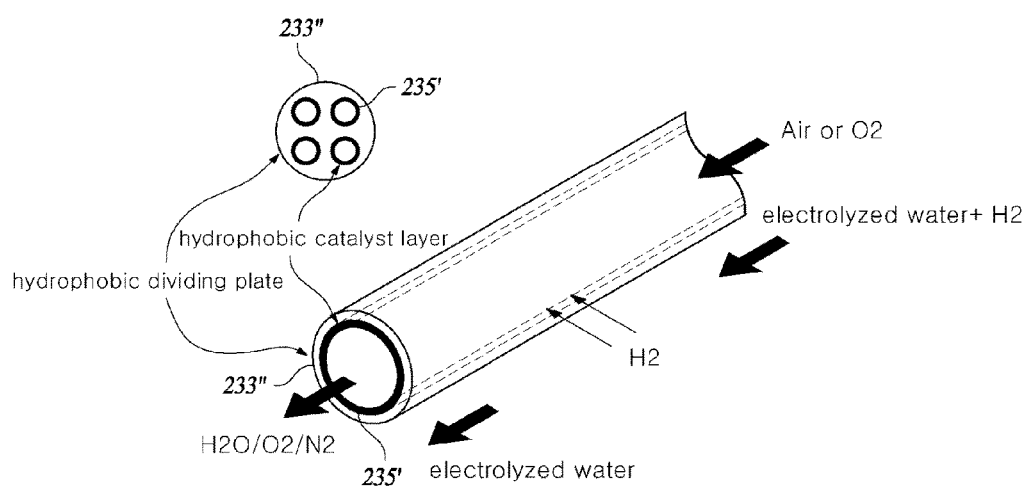
FIG. 6 is a view illustrating another example of the hydrophobic catalyst of FIG. 4.

Further, as shown in FIG. 6, a configuration, in which the ambient air passes inside a tubular-shaped hydrophobic catalyst 235', and one or more hydrophobic catalysts 235' is installed inside a tubular shaped hydrophobic dividing plate 233" so the electrolyte passes outside the hydrophobic dividing plate 233", may be adapted.

Further, although a plate shape in the form of a single layer, or a hollow-fiber shape in the form of a single body has been described in the FIGS. 4 to 6, the present invention is not limited thereto. Accordingly, the catalyst reaction tank 230 may be configured with a variety of modules such as a flat sheet membrane module where the hydrophobic dividing plate and the hydrophobic catalyst have laminated layers, a spiral wound membrane module where the laminated flat membranes are wound around a cylinder, a tubular membrane module filled with a plurality of tubular or hollow-fiber membranes, etc.

As described above, the present invention can achieve safety of an electrolysis process by ultimately preventing the inherent risk with respect to hydrogen gas explosion during the electrolysis process by a technique of removing hydrogen gas produced as by-product gas during electrolysis by the catalyst reaction. Further, the present invention can achieve a reduction in installation time and space, and costs of components without provision of an additional gas-liquid separation means, a pipe configuration, etc., as in the related art, for discharging hydrogen gas, and securing convenience of maintenance and operational safety.

Further, the present invention uses a hydrophobic catalyst for removing hydrogen gas, thereby preventing wetting of the catalyst. Further, an electrolyte is further supplied to reduce the heat of reaction by heat exchange. Therefore, the present invention can achieve a reduction in the risk of explosion caused by the heat of reaction.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

DESCRIPTION OF THE REFERENCE NUMERALS IN THE DRAWINGS

100: electrolysis device 110: raw water supply unit
120: electrolyzing tank 130,130',230: catalyst reaction tank
131,231: body
133,235.235': hydrophobic catalyst
233: hydrophobic dividing plate

The invention claimed is:

1. An electrolysis device, comprising:
an electrolyzing tank generating electrolyzed water, and hydrogen gas as by-product gas by electrolyzing raw water supplied from a raw water supply unit; and
a catalyst reaction tank having therein a hydrophobic catalyst, and receiving the hydrogen gas generated from the electrolyzing tank, and removing the hydrogen gas by a catalyst reaction,
wherein the catalyst reaction tank comprises:
a body;
a hydrophobic dividing plate dividing an inside of the body into a catalyst receiving part provided at a first side, and an electrolyte receiving part provided at a second side; and
the hydrophobic catalyst disposed in the catalyst receiving part, and generating water by the catalyst reaction with the hydrogen gas,
wherein the electrolyte receiving part of the body includes an electrolyte inlet at a first end thereof through which an electrolyte containing by-product hydrogen gas is introduced, and an electrolyte outlet at a second end thereof discharging the electrolyte from which the by-product hydrogen gas is removed, and
wherein the catalyst receiving part of the body includes an ambient air inlet at a first end thereof through which ambient air including oxygen or air is introduced, and a gas outlet at a second end thereof discharging remaining gas that remains in the body after the catalyst reaction.

2. The electrolysis device of claim 1, wherein the electrolyte is a gas-liquid mixture consisting of the electrolyzed water and the byproduct-gas that are generated by electrolysis or the by-product gas that remains in the body after separation of the electrolyzed water from the electrolyte.

3. The electrolysis device of claim 1, further comprising:
a coolant inlet provided on the body so as to supply a coolant via the ambient air inlet through which the ambient air is supplied to the catalyst receiving part of the body.

4. The electrolysis device of claim 3, wherein the electrolyzed water generated by electrolysis or the raw water introduced into the electrolyzing tank is used as the coolant.

5. The electrolysis device of claim 4, wherein the hydrophobic catalyst is supported on one or opposite surfaces of the hydrophobic dividing plate, and is integrally formed into a porous plate membrane structure or a tubular or hollow-fiber membrane structure.

6. The electrolysis device of claim 1, wherein the hydrophobic catalyst is provided as a catalyst that oxidizes hydrogen gas and is supported on a porous hydrophobic support, the hydrophobic support consisting of a porous hydrophobic polymer material, or an inorganic or metal material of which a surface is hydrophobically treated.

7. The electrolysis device of claim 6, wherein the catalyst is composed of one or more elements selected from a group consisting of platinum group metal elements (Pt, Pd, Ru, Ir, Rh, etc.) or transition metal elements (Ni, Cu, Fe, etc.).

8. The electrolysis device of claim 6, wherein the hydrophobic support is composed of one or more porous hydrophobic polymer materials selected from a group consisting of PTFE, PVDF, PP, and SDBC.

9. The electrolysis device of claim 6, wherein the hydrophobic support is formed into one shape selected from a group consisting of bead, honeycomb, sheet, mesh, tube, and hollow-fiber shapes.

10. The electrolysis device of claim 1, wherein the hydrophobic dividing plate is formed into a tubular shape, and the hydrophobic catalyst is formed into a tubular shape and at least one tubular-shaped catalyst is installed inside the hydrophobic dividing plate, such that the hydrophobic catalyst and the hydrophobic dividing plate are formed into a tubular or hollow-fiber membrane structure.

11. The electrolysis device of claim 1, wherein the electrolyte inlet is disposed on a lower portion of the body, the electrolyte outlet is disposed on an upper portion of the body, the ambient air inlet is disposed at a bottom surface of the body, and the gas outlet is disposed at a top surface of the body.

12. The electrolysis device of claim 1, wherein the body comprises:
a coolant inlet through which a coolant is introduced into the body to control heat generated during the catalyst reaction;
a coolant spray head capable of spraying the coolant toward the hydrophobic catalyst; and
a coolant outlet disposed at a bottom surface of the body, through which the coolant after being used is discharged from the body.

13. The electrolysis device of claim 12, wherein the ambient air inlet is installed on a line of the electrolyte inlet to introduce the ambient air into the catalyst reaction tank.

14. The electrolysis device of claim 12, wherein the electrolyzed water generated by electrolysis of the raw water introduced into the electrolyzing tank is used as the coolant.

* * * * *